July 25, 1961
H. MEYER
2,993,921
METHOD FOR THE PRODUCTION OF WATER-INSOLUBLE FATTY
ACID SALTS OF MULTIVALENT-METALS
Filed Nov. 14, 1958
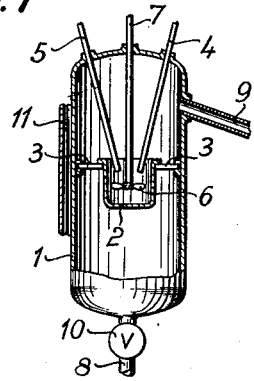
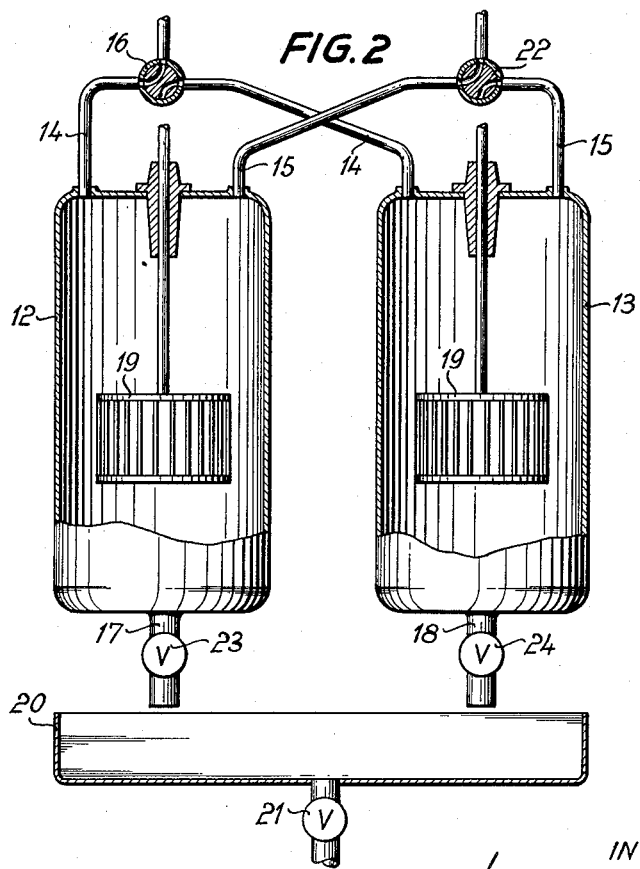
INVENTOR
Helmut Meyer
By Beaman & Beaman

2,993,921
METHOD FOR THE PRODUCTION OF WATER-INSOLUBLE FATTY ACID SALTS OF MULTI-VALENT-METALS

Helmut Meyer, Hamburg, Germany, assignor to H. Wilhelm Schaumann, Hamburg-Lokstedt, Germany
Filed Nov. 14, 1958, Ser. No. 773,855
Claims priority, application Germany Nov. 16, 1957
4 Claims. (Cl. 260—413)

The invention is concerned with the method and apparatus for the production of precipitated water-insoluble salts of multivalent metals especially from high-molecular saturated fatty acids but also from unsaturated or low molecular saturated fatty acids.

According to a principle that has been well-known for a long time the production of water-insoluble metal salts of high-molecular saturated fatty acids precipitated from aqueous solutions was carried out by reacting an alkali soap of a high-molecular saturated fatty acid dissolved in water with a metallic salt dissolved in water; separating the so obtained precipitated product; washing out the still remaining water-soluble salts; drying the cleaned water-insoluble metal salts and, if desired or required, crushing them.

In a technical production process, however, difficulties arise when uniformly composed products are required. A particular disadvantage is the accumulation of water-insoluble salts formed by precipitation, as in this process water-soluble soap, water-soluble metal salt and water-soluble alkali salts formed as by-products on reacting may be occluded. Said occlusions can be removed in the following washing operation only with difficulty.

To minimize the amount of occluded impurities it has been proposed to make the two solutions used for the reaction flow together simultaneously in accordance with their stoichiometrical ratios. In this way it is expected that provision is always made for only a small quantity of the reaction components being present in the reaction container so as to reduce the danger of the reaction product being contaminated by occluded impurities. To substantially remove any unreacted material, the precipitated metal soap is acidified and subjected to an ageing process e.g. tempering at 100° through 150° C. for about 10–20 hours prior to the washing operation.

A disadvantage of this method resides in the fact that the fine structure of the metal soap precipitation is obtained not at the moment of generating but only in an additional working process, namely when being age-hardened. Thus, too much time is afforded for occluding water-soluble salts, which can be removed only with difficulty even in the washing process.

According to the new method hereinafter detailed, however, the metal soap—contrary to the above—is present in the required finely grained structure already at the moment of precipitation.

In the preferred method according to the invention the desired fatty acid is saponified with an aqueous sodium or potassium carbonate solution at a temperature of 50–86° F. above the titer of the fatty acid. The concentration of the resulting soap solution should be 5–20% and the solution should contain an excess of 2–10% of sodium or potassium carbonate. To the aqueous soap solution kept at saponifying temperature is added while stirring and at a low titer of the fatty acid a cold, and at higher titer of the fatty acid a warmed metal salt solution of a concentration of 5–30% and of a pH value of 3–5. A strong acid is used suitable for acidifying the metal salt solution, when sulphates or chlorides are used, for instance, sulphuric acid or hydrochloric acid. Accordingly, a product with small particle size having a low density (low looseweight) is obtained which may be easily washed out. If it is desired to obtain a highly voluminous final product it is advisable to mechanically loosen the washed filter cake during the drying process which loosening operation may be performed during tht drying period when the water content of the product to be dried amounts to about 50% through 10%.

An essential advantage of the new method resides in the generation of carbon dioxide by the excess of carbonate. This effects a considerable enlargement of the surface during the precipitating reactio nand enables the formation of a finely grained precipitate. In addition the content of free fatty acid of the product made by this method is unexpectedly lower by a considerable degree than that of metal soaps made by the known processes.

The water-insoluble metal salts of the high-molecular saturated fatty acids made by the method of the invention are outstanding as compared to products made by the known methods because of their uniform consistency, low weight per unit of volume and high grade of purity (free from alien salts). The method according to the invention is easy to carry out and does not call for expensive apparatus. The aging process is omitted. A continuous working operation is obtained when the inlet passages for the solutions lie in the middle of the reaction container and the precipitation product rising to the surface is deviated while the waste solutions are continuously flowing out of the lower part of the container.

In the production of metal salts by the method according to the invention, on the one hand, all high-molecular saturated fatty acid components as for instance palmitic acid, stearic acid, arachidic acid, behenic acid or mixtures thereof may be used while on the other hand the water-soluble metal salts are suitable that form the corresponding water-insoluble salts of the named fatty acid and contain as multivalent metals for instance magnesium, zinc, calcium, aluminium, strontium, barium or cadmium.

This method may be improved within the scope of the invention by addition of the metal salt solution as quickly as possible to the soap solution in the reaction container.

It has been found that in this way the quality of the substance is further improved; in particular, the possibilities of washing out any alien matter present (for instance metal salts, oxy fatty acids, non-saponifiable matter) are increased and the adhesive properties of the metal soaps are improved. Often, to a certain degree, higher yields are the result.

Another essential advantage of this further improvement of the invention resides in the fact that the precipitated metal soap may be washed out with a considerably smaller amount of liquid fluid so that it is no longer necesary to do the washing only with water but with an organic solvent to which a certain quantity of water may be added. In this way a metallic soap is obtained which contains nearly no non-saponifiable matter so that the purity of the product is essentially increased.

In the beginning of the drying process an elevated temperature is preferably applied. The drying temperature must be some degrees below the melting point of the metal soap. The initially high temperature effects a strong swelling of the metal soap cake to be dried. A similar effect may be obtained if the process is carried out at very low temperatures, as for instance in the freeze drying procedure. The same applies to vacuum drying.

An essential advantage of this new additional way of working is to be seen in the still more voluminous and purer product. The quantities of auxiliary substances required are reduced. In addition, the adhesive properties of these metal soaps are considerably increased.

Furthermore, according to the process of the invention, salts of low-molecular saturated fatty acids, i.e. with less than 12 carbon atoms, and salts of unsaturated fatty acids may be produced advantageously as compared to the prior art, in which salts are formed only by precipitating them on water-insoluble finely dispersed substances.

In particular, the invention embodying the further improvement works as follows:

While in the case of precipitation being effected according to the first-named embodiment of the invention the solutions participating in the reaction flow together while being stirred in a container, now the metal salt solution is added as quickly as possible to an aqueous soap solution already present in the reaction container. A very strong reaction will take place here and therefore a sufficient space must be left free in the container. Furthermore, care must be taken to avoid any pressure in excess of atmospheric pressure, which latter may result from said reaction. The metal soaps thus precipitated may be separated considerably easier from their accompanying substances by washing. A small addition of organic solvents which may contain water or a mixture composed of an organic solvent and water, for instance a small addition of alcohol to the washing water will yield a metal soap which contains practically no non-saponifiable matter. In practice, when using a conventional rotary drum filter to work during the washing procedure, the solvent containing the alcohol may be provided for the last sprinkling arrangement only. The quantity of alcohol-containing washing liquor required for the after-treatment is in connection with the last-named embodiment of the present invention only about one-half as compared with the first named one.

The following examples serve the purpose of a further description of the new method but the invention is not limited to these examples. In this description the Examples 1 and 2 in particular pertain to the first embodiment and the Examples 3 and 4 to the second embodiment of the invention.

*Example 1*

For the production of magnesium stearate, 1.18 kg. soda is dissolved in 70 ltr. of water; the solution is heated to 176° F. and 6 kg. of stearic acid of an acid avlue of 198 and of a titer of 145.5° F. are slowly added. 2.70 kg. of crystallized magnesium sulphate are dissolved in 25 ltr. of warm water of a temperature of about 122° F.; the pH value is adjusted to about 3.5 by adding sulphuric acid and this solution is added with stirring to the soap solution which is kept at a temperature of 176° F. during the addition. In this way magnesium stearate is precipitated in the form of a white, finely granulated precipitate. The precipitate is washed with clear water and the filter cake remaining after washing is dried at a temperature of about 167°–185° F. After reaching a moisture content of about 20% the filter cake is loosened and dried to a water content of 2%.

*Example 2*

For making zinc stearate 1.18 kg. of soda is dissolved in 70 ltr. of water, the solution heated to 176° F. and 6 kg. stearic acid of an acid value of 198 and of a titer of 145.5° F. slowly added. 3.05 kg. of crystallized zinc sulphate is dissolved in 25 ltr. of water of a temperature of about 140° F.; the pH value is adjusted to about 4.0 by adding sulphuric acid and this solution is added with stirring to the soap solution which is kept at a temperature of 176° F. during the addition. Zinc stearate is precipitated as a white, finely granulated precipitate. The precipitate is washed with clear water and the filter cake remaining after washing dried at a temperature of about 167–185° F. After reaching a moisture content of about 25%, the filter cake is loosened and dried to a water content of 0.1%.

*Example 3*

For the production of calcium palmitate 1.10 kg. of soda are dissolved in 55 ltr. of water; the solution is heated to 176–185° F. and 5.00 kg. of palmitic acid of an acid value of 217.0 and a titer of 135.9° F. are slowly added. The container for the soap solution has a capacity of 300 ltr. 2.20 kg. of crystallized calcium chloride are dissolved in 20 ltr. of hot water of a temperature of about 140° F.; the pH value is adjusted to about 5.9 by adding hydrochloric acid and this solution is quickly added with stirring to the soap solution of 176° F.–185° F. through a wide precipitation tube in one feeding operation. After the very strong reaction is finished and after stopping the operation of the stirring apparatus a white, finely granulated precipitate will be present. This precipitation is now washed with water in a rotatable filter and dried in the first instance at a temperature of 176° F. for half an hour and then further dried at a temperature of 113° F. After reaching a moisture content of about 30% the filter cake is loosened by means of mechanical devices and still further dried to a water content of 0.8%. The so obtained calcium palmitate is in an extremely voluminous form and of high purity and light color.

The attached drawing shows schematically two devices for applying the method, in which FIG. 1 shows a device for execution of the method according to the first embodiment of the invention.

FIG. 2 shows a device for execution of the method according to the second embodiment of the invention.

In FIG. 1 a reaction container of a capacity of, for instance 200 ltr. is indicated by reference numeral 1, which for heating purposes is provided with a casing indicated by reference numeral 11. The heating may be effected with steam or with water, but heating with oil is also possible. In the inside of container 1, about centrally arranged, there is a reaction pot 2 suspended with the aid of arms or the like 3. To this reaction pot 2 the solutions flow, i.e. the metal salt solution through a conduit 4 and the soap solution through a conduit 5. In addition a stirring device is accommodated in the reaction pot—for instance a propeller 6—which may be driven by means of a shaft 7. After reaction the solution overflows the upper edge of pot 2, and passes to the bottom of container 1, wherefrom it is successively tapped off via a conduit 8 by more or less opening a valve 10 arranged in said conduit. The finished reaction product is continuously tapped off via a conduit 9.

According to FIG. 2, there are provided two reaction containers, to which on the one hand the soap solution is carried via a conduit 14 equipped with a two-way valve 16 and on the other hand the metal salt solution via a conduit 15 equipped with a two-way valve 22. The containers proper are emptied by means of conduits 17, 18 equipped with valves 23, 24 into a receiving container 20 which serves to receive the metal soap. In the reaction containers 12 and 13 stirring devices 19 are provided. The two-way valves 16, 22 and the stirrer 19 in container 13 are actuated in relation to each other in such a way that the one container 12 that has just been emptied is supplied with the soap solution via the conduit 14, whilst the other one 13, that has already been filled with soap solution is supplied under simultaneous stirring with the metal salt solution via conduit 15. After the soap solution in the first container 12 has reached a desired height a changing will take place in such a way that this container 12 now receives the metal salt solution via conduit 15 and the stirring device 19 of the reaction container 12 will be actuated, while the other container 13 is emptied into the receiving container 20 by actuating the valve 24, whereupon the reaction container 13 is supplied anew with the soap solution via the conduit 14. The stirring device is started about simultaneously when adding the metal salt solution. Finally the first container 12 is emptied into the receiving container by actuating the valve 24, and the metal soap solution is tapped off in regulated quantities from the container via a valve 21. The procedure is then continued always alternating in the described manner. It lies of course within the scope of the invention to apply instead of two containers several, and especially three reaction containers.

What I claim is:

1. A method for producing water-insoluble multivalent metal salts of high-molecular saturated fatty acids by precipitation from aqueous solutions, which comprises saponifying the fatty acid with an excess of alkali carbonate of between about 2% and 10%, forming a precipitate by reacting the mixture of saponified fatty acid and excess alkali carbonate with an acidified aqueous multivalent metal salt solution having a pH of about 3–5, and separating the precipitate.

2. A method as claimed in claim 1, the alkali carbonate being sodium carbonate.

3. A method as claimed in claim 1, the alkali carbonate being potassium carbonate.

4. A method as claimed in claim 1, said saponification being conducted at a temperature of about 50–86° F.

References Cited in the file of this patent

UNITED STATES PATENTS

| | | |
|---|---|---|
| 185,964 | Reynoso | Jan. 2, 1877 |
| 2,211,139 | Licata | Aug. 13, 1940 |
| 2,252,658 | Bigalow | Aug. 12, 1941 |
| 2,378,138 | Gaylor | June 12, 1945 |